US010437901B2

(12) United States Patent
Walkingshaw et al.

(10) Patent No.: US 10,437,901 B2
(45) Date of Patent: Oct. 8, 2019

(54) IDENTIFYING SIMILAR CONTENT ON A DIGITAL MAGAZINE SERVER

(71) Applicant: Flipboard, Inc., Palo Alto, CA (US)

(72) Inventors: Andrew David Walkingshaw, San Francisco, CA (US); Xiaoyu Fei, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 128 days.

(21) Appl. No.: 14/049,159

(22) Filed: Oct. 8, 2013

(65) Prior Publication Data
US 2015/0100587 A1   Apr. 9, 2015

(51) Int. Cl.
*G06F 16/954* (2019.01)

(52) U.S. Cl.
CPC .................. *G06F 16/954* (2019.01)

(58) Field of Classification Search
CPC ......... Y10S 707/99933; G06F 17/3071; G06F 17/30713; G06F 17/30867; G06F 17/30864; G06F 17/30598; G06F 17/30324; G06F 19/322; G06F 17/30699; G06F 16/285; G06Q 30/02; G06Q 30/0269; G06Q 30/0601; H04L 67/306; H04N 21/25891; H04N 21/4782; H04H 60/46; G02C 7/04; G02C 7/083
USPC ............... 707/736, 748–749, 732–734, 751, 707/E17.051, 767, 784, E17.084, E17.071
See application file for complete search history.

(56) References Cited

U.S. PATENT DOCUMENTS

| | | | | |
|---|---|---|---|---|
| 6,728,752 | B1 * | 4/2004 | Chen et al. | ................... 709/203 |
| 6,757,691 | B1 * | 6/2004 | Welsh | ..................... G06Q 30/02 |
| 6,912,505 | B2 * | 6/2005 | Linden | ................... G06Q 30/02 705/14.53 |
| 7,383,285 | B1 * | 6/2008 | Pal | ..................... G06F 17/30607 |
| 7,424,439 | B1 * | 9/2008 | Fayyad | .................. G06Q 30/02 705/7.33 |
| 7,441,203 | B2 * | 10/2008 | Othmer | .............. G06Q 30/0243 455/456.1 |
| 7,673,340 | B1 | 3/2010 | Cohen et al. | |
| 7,716,225 | B1 * | 5/2010 | Dean | ................. G06F 17/30867 707/748 |
| 8,539,359 | B2 * | 9/2013 | Rapaport | ............... G06Q 10/10 715/751 |
| 8,788,487 | B2 | 7/2014 | Stout et al. | |
| 8,874,586 | B1 * | 10/2014 | Sommers et al. | ............ 707/748 |
| 9,037,592 | B2 | 5/2015 | Walkingshaw et al. | |
| 9,092,529 | B1 | 7/2015 | Gyuongyi et al. | |

(Continued)

*Primary Examiner* — Alex Gofman
*Assistant Examiner* — Linh Black
(74) *Attorney, Agent, or Firm* — Fenwick & West LLP

(57) ABSTRACT

A digital magazine identifies content items for recommendation to a user by determining the address information of one or more content items. The address information of a content item identifies a source from which the content item was received and additional information describing the content item. Representations of content items are generated from the address information for each content item. Additionally, representations of content items previously presented to the user are generated from the address information for the previously presented content items. A measure of similarity between a representation of a content item and a representation of a previously presented content item is determined and used to select content items to present to the user.

11 Claims, 3 Drawing Sheets

(56) References Cited

U.S. PATENT DOCUMENTS

| | | | |
|---|---|---|---|
| 9,424,461 B1* | 8/2016 | Yuan | G06K 9/00201 |
| 9,489,352 B1* | 11/2016 | Agostino | G06F 17/2235 |
| 2003/0074369 A1* | 4/2003 | Schuetze et al. | 707/103 R |
| 2003/0110181 A1* | 6/2003 | Schuetze et al. | 707/103 R |
| 2006/0064411 A1* | 3/2006 | Gross | G06F 17/30864 |
| 2007/0168465 A1* | 7/2007 | Toppenberg | G06Q 50/16 |
| | | | 709/218 |
| 2009/0254971 A1* | 10/2009 | Herz et al. | 726/1 |
| 2010/0169340 A1* | 7/2010 | Kenedy | G06Q 30/0631 |
| | | | 707/758 |
| 2010/0205541 A1* | 8/2010 | Rapaport | G06Q 10/10 |
| | | | 715/753 |
| 2010/0241647 A1* | 9/2010 | Ntoulas | G06F 17/30528 |
| | | | 707/765 |
| 2010/0306249 A1 | 12/2010 | Hill et al. | |
| 2011/0167061 A1* | 7/2011 | Li | G06F 17/30244 |
| | | | 707/728 |
| 2012/0079323 A1 | 3/2012 | Chincisan | |
| 2012/0089455 A1 | 4/2012 | Belani et al. | |
| 2012/0265744 A1* | 10/2012 | Berkowitz | G06F 17/30873 |
| | | | 707/705 |
| 2013/0332593 A1 | 12/2013 | Patnaikuni et al. | |
| 2014/0067825 A1 | 3/2014 | Oztaskent et al. | |
| 2014/0068654 A1 | 3/2014 | Marlow et al. | |
| 2014/0074863 A1 | 3/2014 | Walkingshaw et al. | |
| 2014/0075296 A1 | 3/2014 | Schaad et al. | |
| 2014/0075339 A1* | 3/2014 | Weskamp | H04L 65/403 |
| | | | 715/753 |
| 2014/0258261 A1* | 9/2014 | Singh et al. | 707/709 |

\* cited by examiner

IDENTIFYING SIMILAR CONTENT ON A DIGITAL MAGAZINE SERVER

BACKGROUND

This invention relates generally to characterizing a collection of content items, and more particularly to categorizing content items in the collection based on the address information associated with content items.

A digital magazine identifies content items for presentation to users based on user-defined preferences or parameters. These content items are presented to users via devices such as mobile devices, tablet computers, laptop computers, or desktop computers. As a user interacts with content items presented in a digital magazine, additional content items may be identified for presentation to the user based on the interactions. For example, the additional content items are selected based on their similarity to content items with which the user previously interacted.

Conventional methods for determining similarity of various content items compare content presented by the content items. For example, to compare textual articles, comparing the frequency with which keywords appear in different articles provides a measurement of similarity. However, if content items include a variety of types of content, such as image data, audio data, video data, text data, advertisements, or other content, conventional methods are less capable of accurately determining similarity between different content items. When presenting content in a digital magazine, identifying content items similar to those previously presented to a user is likely to increase user interaction with the digital magazine.

SUMMARY

A digital magazine server creates a digital magazine including content items for presentation to a user. The digital magazine server organizes content items having at least one common characteristic into various sections, and presents content items to the user according to the sections. To maintain user interaction with content items presented to the user, the digital magazine server identifies additional content items for presentation to the user. In one embodiment, the digital magazine sever identifies additional content items to present to a user based on a similarity between the additional content items and content items previously presented to the user.

To identify additional content items for presentation to a user, the digital magazine server obtains the address information associated with additional content items obtained from one or more sources. In various embodiments, the address information is retrieved based on one or more criteria. For example, after a user has interacted with at least a threshold number of content items presented in a digital magazine, the address information for one or more additional content items is retrieved. A content item's address information is information identifying the source from which the content item was obtained and information used by the source to uniquely identify the content item. For example, the address information of a content item is a uniform resource locator (URL) identifying the content item. Attributes of the content item's address information may be identified by parsing the address information. Examples of attributes of the address information include: text extracted from the address information, a domain identifier, a file type, a date and/or time, a top-level domain type, or other suitable information.

A representation of the attributes of the address information for each additional content item is generated by the digital magazine server. For example, the digital magazine server generates a vector describing various attributes of the address information for an additional content item. In one embodiment, the vector includes numerical values describing different attributes of the address information, such as binary representations of the attributes. In one embodiment, weights are associated with different vectors based at least in part on the attributes of the address information represented by the different vectors. For example, a weight is associated with a vector representing the address information of a content item including all text data, while a different weight is associated with a vector representing the address information of a content item including text data and other types of data, and an alternative weight is associated with a vector representing the address information of a content item that does not include text data. In another embodiment, weights are associated with different attributes of the address information rather than with a vector as a whole. The weights associated with various vectors may be modified based on information in a user profile associated with the user, based on attributes of content items with which a user previously interacted, or based on other suitable information.

Additionally, the digital magazine server generates representations of the address information for content items previously presented to the user. Based on the representations of the address information for the previously-presented content items and the representations of additional content times, measures of similarity between an additional content item and one or more previously-presented content items are determined. For example, a measure of similarity between an additional content item and each previously-presented content item is determined. If vectors are used to represent the additional content item and each previously-presented content item, a centroid measurement of the vectors describing previously-presented content items is determined, and the vector representing the additional content item is compared to the centroid rather than to each vector describing previously-presented content items. Any suitable comparison between the representation of the additional content item and the representation, or representations, of the previously-presented content items may be used. For example, a cosine similarity between a vector representing the additional content item and the centroid of vectors representing previously-presented content items is determined. If the measure of similarity between the representation of the additional content item and the representation, or representations, of one or more previously-presented content items equals or exceeds a threshold value, the additional content item is selected for presentation to the user.

Additionally, a measure of similarity between content items presented to a user and content items presented to another user may be determined based on the address information of the content items presented to the user and the content items presented to the additional user. Representations of content items presented to the user and representations of content items presented to the additional user are generated. In one embodiment, an average or a centroid of the representations of the content items presented to the user and an average or a centroid of the representations of the content items presented to the additional user are determined. The average of the representations of the content items presented to the user and the average of the representations of the content items presented to the additional user are compared, and if they are within a threshold value, the content items presented to the additional user and the content items presented to the user are determined to be similar, so the content items presented to the additional user may be presented to the user and vice versa. Alternatively, the additional user may be identified to the user as a potential source of content items for the user. For example, if the cosine similarity between the average of the representations of the content items presented to the user and the average of the representations of the content items presented to the additional user is at least a threshold value, the content items presented to the user are determined to be similar to the content items presented to the additional user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
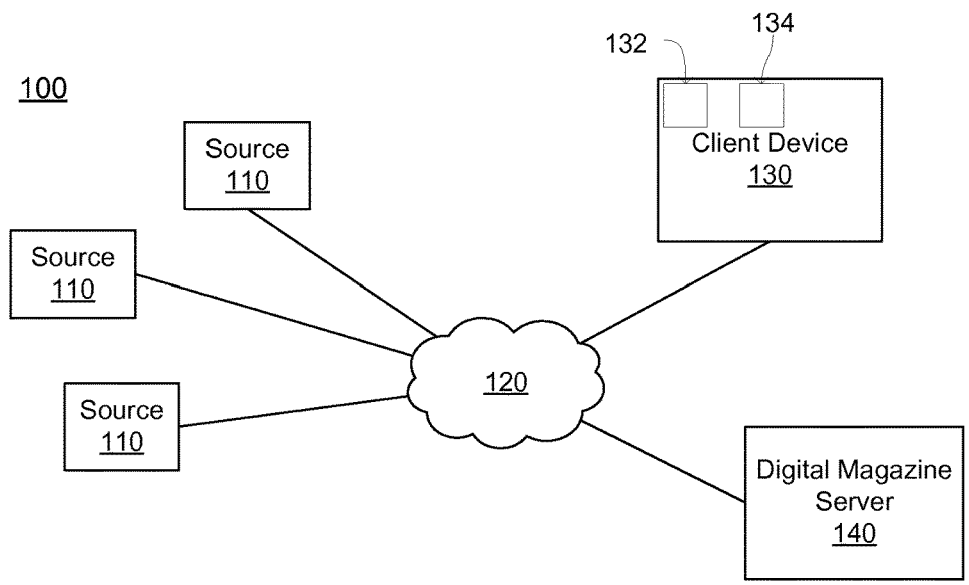
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 110 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
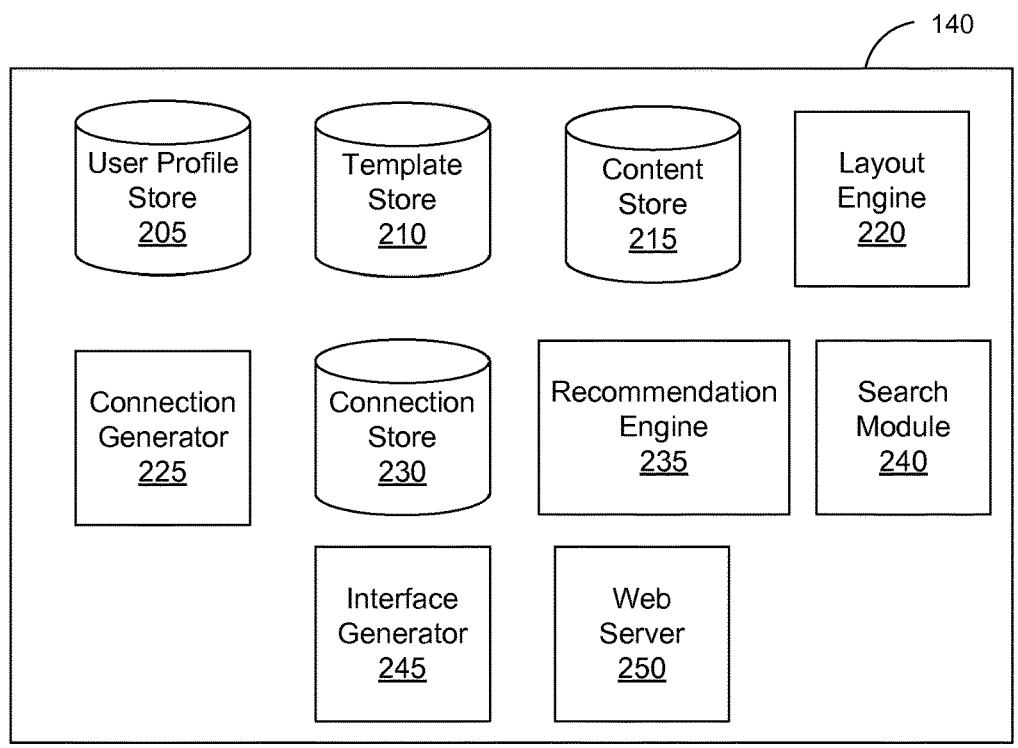
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. In another embodiment, the recommendation engine 235 identifies content items for recommendation to a user based on a measure of similarity between a content item and content items previously presented to the user by the digital magazine server 140, as further described below in conjunction with FIG. 4. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS® or BlackeberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, the digital magazine server 140 identifies additional content items from one or more sources 110 that have a threshold measure of similarity to content items previously presented to a user by the digital magazine server 140, as further described below in conjunction with FIG. 4. Alternatively, the digital magazine server 140 and the client device 130 operate in conjunction with each other to identify additional content items with at least a threshold measure of similarity to content items previously presented to a user. For example, the digital magazine server 140 identifies additional content items with at least a threshold measure of similarity to content items previously presented to the user, while an application associated with the digital magazine server 140 executing on the client device 130 presents the identified additional content items to the user.

Page Templates

Figure 3:
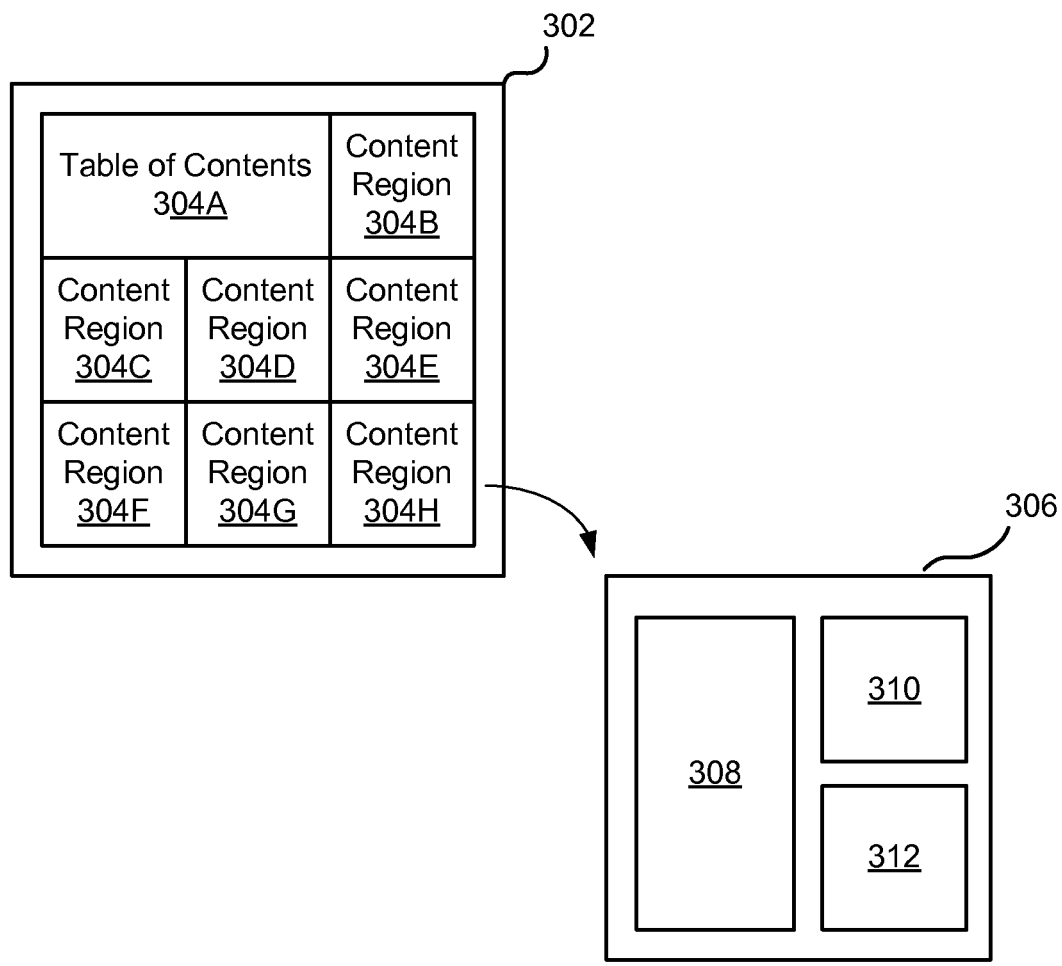
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Identifying Content Items for Presentation to a Digital Magazine Server User

Figure 4:
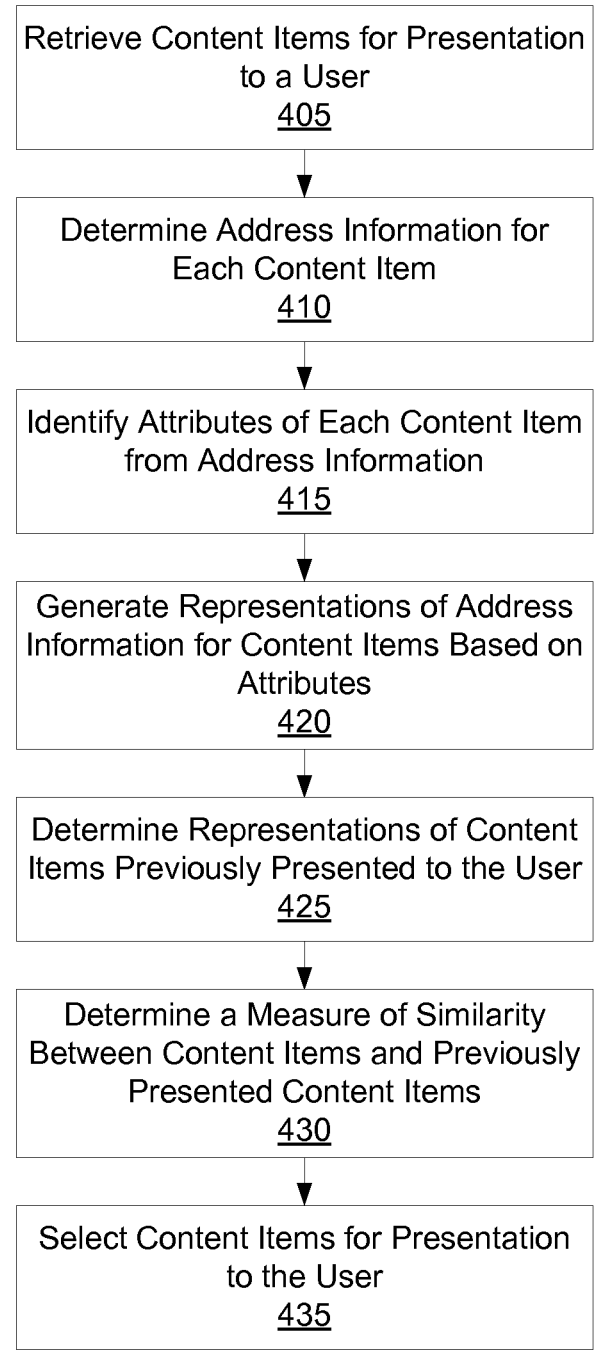
FIG. 4 is a flow chart of a method for identifying content items with at least a threshold measure of similarity to each other, in accordance with an embodiment of the invention.

FIG. 4 is a flowchart of one embodiment of a method for identifying content items for presentation to a user of the digital magazine server 140. In other embodiments, the method may include different and/or additional steps than those shown in FIG. 4. The functionality described in conjunction with the digital magazine server 140 in FIG. 4 may be provided by the recommendation engine 235, in one embodiment, or may be provided by any other suitable component, or components, in other embodiments. Additionally, the client device 130 may execute one or more instructions associated with the digital magazine server 140, such as an application associated with the digital magazine server 140, to provide the functionality described in conjunction with FIG. 4.

One or more content items are retrieved 405 for presentation from one or more sources 110. The content items may be retrieved 405 from one or more sources 110 by the digital magazine server 140 providing a request to one or more of the sources 110; alternatively, one or more sources 110 communicate content items to the digital magazine server 140 when a condition is met (e.g., additional content items are received by a source 110, a time interval between a current time and a time when content items were sent to the digital magazine server 140 has passed, etc.). For example, the digital magazine server 140 retrieves 405 one or more content items from various sources 110 via the network 130. As another example, the digital magazine server 140 retrieves 405 one or more content items from its content store 215. However, in various embodiments, content items may be retrieved 405 from one or more sources 110 as well as from the content store 215. Alternatively, an application associated with the digital magazine server 140 and executing on a client device 130 retrieves 405 content items from the digital magazine server 140. The application associated with the digital magazine server 140 may retrieve 405 the content items from the digital magazine server 140, from one or more sources 110, or from the digital magazine server 140 and from one or more sources 110. In some embodiments, the application associated with the digital magazine server 140 retrieves 405 content items when a user has accessed a threshold number of content items via the application associated with the digital magazine server 140, when the application associated with the digital magazine server 140 receives a request for content items from a user, or based on any other suitable condition.

The address information for each of the one or more retrieved content items are determined 410. The address information for a content item specifies a source 110 from which the content item was retrieved and may include information used by the source 110 to describe the content item. For example, the address information includes information used by a source 110 to distinguish the content item from other content items maintained by the source 110. For example, if information describing a content item, such as an article, maintained by a source 110 distinguishes a location where the source 110 maintains the content item from locations used by the source 110 to maintain additional content items. Examples of the address information for a content item include a universal resource identifier (URI) (e.g., a uniform resource locator (URL) or a uniform resource name (URN)) or any other location identifier of the content item on the web. In one embodiment, the digital magazine server 140 determines 410 the address information for each of the retrieved content items. For example, the connection generator 225 or recommendation engine 235 determines 410 the address information associated with various content items, which is stored in the content store 215 and associated with the corresponding content item.

One or more attributes associated with each retrieved content item are identified 415 from the address information associated with a content item. Examples of attributes identified from the address information include: text extracted from the address information, a domain identifier, a file type, a date, a time, a top-level domain type, or other suitable information. If the address information is a URL, a textual string representation of the URL is parsed to identify 415 one or more attributes of a content item associated with the URL. In other embodiments, any suitable information extraction process, such as one or more syntactic analysis processes, may be used to identify 415 attributes from the address information associated with content items.

Representations of the address information for each content item are generated 420 based at least in part on the attributes identified 415 from the address information for various content items. A representation of the address information includes information describing one or more of attributes identified from the address information. For example, the digital magazine server 140 generates 420 a vector describing various attributes of the address information for a content item. In one embodiment, the vector includes numerical values describing different attributes of the address information, such as binary representations of the attributes. For example, if an attribute indicates a content item is video, an element in the vector specifying whether the content item is a video has a value of "1," while the element has a value of "0" if the attribute indicates the content item is not video. Additional examples of representations of the address information for a content item include: a queue, a priority queue, a stack, an array, a list, a set, a map or any other suitable structure for storing data.

In one embodiment, attributes of the address information for a content item may be weighted, where a value associated with an attribute is weighted when used to generate 420 the representation of the address information. Weights associated with one or more attributes may be based at least in part on information in a user profile associated with the user (e.g., user preferences, prior user interactions with content items), attributes of content items with which the user previously interacted, or other suitable information. For example, if an attribute indicates a content item is video data and prior user interactions with content items indicate the user spends less than a threshold amount of time viewing video data, a value of an element of a representation of the address information for the content item is reduced by a weight (e.g., a value of 1 indicating the content item is video data is reduced by a weight of 0.1, so the value of a corresponding element in the representation is 0.1). As another example, if prior user interactions with content items indicate the user spends at least a threshold amount of time viewing video data, the value of the element of the representation of the address information for the content item is increased by a weight (e.g., a value of 1 indicating the content item is video data is increased by a weight of 1.1, so the value of a corresponding element in the representation is 1.1). In some embodiments, settings of the digital magazine server 140 may determine or affect the weights associated with one or more attributes of content items. Similarly, weights may be associated with a representation of the address information for a content item in its entirety based at least in part on information in a user profile associated with the user (e.g., user preferences, prior user interactions with content items).

Alternatively, settings of the digital magazine server 140 specifying objectives or preferences for recommending content items to the user may determine weights associated with representations of the address information of content items. For example, if the digital magazine server 140 includes a setting to increase the amount of video data recommended to a user, a weight is associated with a vector representing the address information of a content item including all video data, while a relatively lower weight is associated with a vector representing the address information of a content item including text data. Weights may be associated with representations of the address information based on any suitable attribute of the address information of the content item.

Weights associated with a representation of address information of a content item or with attributes of the address information of a content item may be stored in the content store 215 along with an association with the content item.

Content items previously presented to the user by the digital magazine server 140 are identified and representations of one or more of the previously presented content items are determined 425 based on the address information associated with the previously presented content items, as described above. For example, content items previously presented to the user by the digital magazine server 140 are content items from a digital magazine accessed by the user or a collection of content items specified by the user. However, content items previously presented to the user may be identified based on any suitable connection between content items and the user.

Using the representations of the address information for content items and the representations of the address information content items previously presented to the user, measures of similarity between one or more of the content items and one or more of the content items previously presented to the user are determined 430. In some embodiments, additional information may be used to determine 430 a measure of similarity between a representation of the address information for a content item and a representation of the address information for a content item previously presented to the user. For example, a cosine similarity between a vector representing the address information for a content item and a vector representing the address information for a content item previously presented to the user is determined 430. As another example, distances (e.g., Euclidean distances) between each attribute in a representation of the address information for a content item and a representation of the address information for a content item previously presented to the user are determined and combined to determine 430 a measure of similarity between the content item and the content item previously presented to the user. In other embodiments, any suitable method for determining 430 a measure of similarity between representations of the address information for content items and representations of the address information for content items previously presented to the user may be used.

Based at least in part on the measures of similarity between content items and content items previously presented to the user, one or more of the content items are selected 435 for presentation to the user. In one embodiment, a content item having at least a threshold measure of similarity to a content item previously presented to the user is selected 435 for presentation to the user. For example, one or more content items having at least the threshold measure of similarity to one or more content items previously presented to the user are selected 435 and included in a section of a digital magazine presented to the user. As another example, information identifying one or more selected content items is presented to the user via an application associated with the digital magazine server 140 executing on a client device 130.

While FIG. 4 describes selecting 435 content items for presentation to the user based on a measure of similarity determined 430 from representations of the address information for content items and representations of the address information of content items previously presented to the user, the measure of similarity may be used in a variety of ways. For example, the measure of similarity between content items may be used to generate groups or clusters of content items having at least a threshold measure of similarity to each other. In another example, the measure of similarity between content items may be used to partition groups or clusters of content items into additional groups or additional clusters. The measure of similarity may also be used to rank content items in a group or cluster. Additionally, rather than determine 430 a measure of similarity between content items to be presented to the user and content items previously presented to the user based on address information associated with the content items to be presented and the content items previously presented, a measure of similarity between different content items to be presented to the user (or between different content items previously presented to the user) may be determined based on the address information associated with the different content items.

In one embodiment, representations of the address information for multiple content items previously presented to the user are analyzed to generate a combined representation of the address information for the multiple content items previously presented to the user. For example, a centroid of vectors representing the address information for multiple content items previously presented to the user is generated; however, an average or other value representing representations of the address information for multiple content items may be generated. Similarly, a combined representation of the address information for multiple content items for presentation to the user may be generated, such as a centroid of vectors representing the address information for each of the multiple content items. A measure of similarity between the combined representation of the address information for multiple content items to be presented to the user and the combined representation of the address information for multiple content items previously presented to the user may be determined 430, and the multiple content items selected 435 for presentation to the user if the measure of similarity, such as a cosine similarity, between the combined representation of the address information for multiple content items to be presented to the user and the combined representation of the address information for multiple content items previously presented to the user has at least a threshold value.

As another example, a combined representation of the address information for content items presented to a user is generated and a combined representation of the address information for content items presented to an additional user is generated, as described above. A measure of similarity between the combined representation of the address information for content items presented to a user and the combined representation of the address information for content items presented to an additional user is determined. If the measure of similarity has at least a threshold value, the content items presented to the additional user are selected for presentation to the user. Alternatively, the additional user is identified to the user if the measure of similarity has at least the threshold value.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for identifying content items for presentation to a user of a digital magazine server, the method comprising:
   retrieving one or more content items from one or more sources in response to the user interacting with at least a threshold number of content items provided by the digital magazine server;
   determining address information for each of the retrieved one or more content items, the address information for a content item specifying a source from which the content item was retrieved and information describing the content item;
   identifying one or more attributes associated with each of the retrieved content items, one or more attributes of the content item determined from the address information for the content item;
   assigning one or more weights to the one or more attributes identified from the address information for one or more content items, the one or more weights based on information associated with the user by the digital magazine server and based on attributes of content items provided by the digital magazine server with which the user previously interacted;
   generating representations of the address information for each of the content items based at least in part on values of one or more attributes identified from the address information and the one or more weights assigned to the one or more attributes;
   associating additional weights with representations of the address information for each of the content items based on one or more settings of the digital magazine server specifying one or more objectives of the digital magazine server for recommending content items based on types of data included in content items;
   determining representations of one or more content items previously presented to the user by the digital magazine server, each representation of a content item previously presented to the user based at least in part on the address information for the content item previously presented to the user;
   determining a measure of similarity between one or more of the content items and the one or more content items previously presented to the user based at least in part on the representations of the address information weighted by a corresponding associated additional weight for each of the one or more content items and the representations of the address information for the one or more content items previously presented to the user; and
   selecting, for presentation to the user, at least one of the one or more content items with at least a threshold measure of similarity with one or more of the content items previously presented to the user.

2. The method of claim 1, wherein associating additional weights with representations of the address information for each of the content items based on one or more settings of the digital magazine server specifying one or more objectives of the digital magazine server for recommending content items based on types of data included in content items comprises:
   associating an additional weight with a representation of the address information for a content item is further based at least in part on one or more selected from a group consisting of: information in a user profile associated with the user, one or more attributes of content items with which the user previously interacted, and any combination thereof.

3. The method of claim 1, wherein the measure of similarity between a content item and a content item previously presented to the user is a cosine similarity between the representation of the content item and the representation of the content item previously presented to the user.

4. The method of claim 1, wherein a representation of the address information for the content item comprises a vector.

5. A method for identifying content items for presentation to a user of a digital magazine server, the method comprising:
   retrieving one or more content items from one or more sources presented to the user;
   retrieving additional one or more content items from one or more sources presented to an additional user of the digital magazine server in response to the user interacting with at least a threshold number of content items presented to the user;
   determining address information for each of the retrieved one or more content items presented to the user, the address information for a content item presented to the user specifying a source from which the content item presented to the user was retrieved and information describing the content item presented to the user;

determining address information for each of the retrieved one or more additional content items presented to the additional user, the address information for an additional content item presented to the additional user specifying a source from which the additional content item presented to the additional user was retrieved and information describing the additional content item presented to the additional user;

identifying one or more attributes associated with each of the retrieved one or more content items presented to the user, one or more attributes of the content item presented to the user determined from the address information for the content item presented to the user;

assigning one or more weights to the one or more attributes associated with each of the retrieved one or more content items presented to the user, the one or more weights assigned to the one or more attributes associated with each of the retrieved one or more content items presented to the user based on information associated with the user by the digital magazine server and based on attributes of content items provided by the digital magazine server with which the user previously interacted;

identifying one or more attributes associated with each of the retrieved one or more additional content items presented to the additional user, one or more attributes of the additional content item presented to the additional user determined from the address information for the additional content item presented to the additional user;

assigning one or more additional weights to the one or more attributes associated with each of the retrieved one or more additional content items presented to the additional user, the one or more additional weights assigned to the one or more attributes associated with each of the retrieved one or more additional content items based on information associated with the user by the digital magazine server and based on types of data included in content items;

generating representations of the address information for each of the one or more content items presented to the user based at least in part on values of one or more attributes identified from the address information for each of the one or more content items presented to the user and the one or more weights assigned to the one or more attributes;

generating a combined representation of the one or more content items presented to the user based at least in part on the generated representations of the address information for each of the one or more content items presented to the user;

generating additional representations of the address information for each of the one or more additional content items presented to the additional user based at least in part on values of one or more attributes identified from the address information for each of the one or more additional content items presented to the additional user and the one or more additional weights assigned to the attributes of the retrieved one or more content items presented to the user;

associating weights with the additional representations of the address information for each of the one or more additional content items presented to the additional user based on one or more settings of the digital magazine server specifying one or more objectives of the digital magazine server for recommending content items;

generating an additional combined representation of the one or more additional content items presented to the additional user based at least in part on the generated additional representations of the address information for each of the one or more additional content items presented to the additional user;

determining a measure of similarity between the combined representation and the additional combined representation; and identifying to the user the additional one or more content items presented to the additional user if the measure of similarity has at least a threshold value.

6. The method of claim 5, wherein determining the measure of similarity between the combined representation and the additional combined representation comprises:
determining a cosine similarity between the combined representation and the additional combined representation.

7. The method of claim 5, wherein generating the combined representation of the one or more content items comprises:
generating a centroid of the generated representations of the address information for each of the one or more content items presented to the user.

8. The method of claim 5, wherein generating the additional combined representation of the one or more additional content items presented to the additional user comprises:
generating a centroid of the generated additional representations of the additional address information for each of the one or more additional content items presented to the additional user.

9. The method of claim 5, wherein identifying to the user the additional one or more content items presented to the additional user if the measure of similarity has at least the threshold value comprises:
presenting the additional one or more content items to the user if the measure of similarity has at least the threshold value.

10. The method of claim 5, wherein identifying to the user the additional one or more content items presented to the additional user if the measure of similarity has at least the threshold value comprises:
presenting information identifying the additional user to the user if the measure of similarity has at least the threshold value.

11. A method for determining similarity between content items associated with a digital magazine server, the method comprising:
retrieving a content item for presentation to a user of the digital magazine server from a source;
determining address information for the content item, the address information specifying the source and information describing the content item;
retrieving an additional content item from an additional source in response to the user interacting with at least a threshold number of content items presented to the user by the digital magazine server;
determining additional address information for the additional content item, the additional address information specifying the additional source and information describing the additional content item;
identifying one or more attributes associated with the content item from the address information for the content item;

identifying one or more attributes associated with the additional content item from the additional address information for the additional content item;

generating a representation of the address information for the content item based at least in part on one or more attributes identified from the address information for the content item, the representation of the address information for the content item generated based at least in part on one or more weights assigned to the one or more attributes identified from the address information based at least in part on information in a user profile associated with the user by the digital magazine server and based on attributes of content items provided by the digital magazine server with which the user previously interacted;

generating an additional representation of the additional address information for the additional content item based at least in part on one or more attributes identified from the additional address information for the additional content item, the additional representation of the address information for the content item generated based at least in part on one or more weights assigned to the one or more attributes identified from the additional address information based at least in part on information in the user profile associated with the user by the digital magazine server;

associating an additional weight with the additional representation of the address information for the additional content item based on one or more settings of the digital magazine server specifying one or more objectives of the digital magazine server for recommending content items based on types of data included in content items; and determining a measure of similarity between the content item and the additional content item based at least in part on the representation of the address information for the content item and the representation of the additional address information for the additional content item.

* * * * *